Dec. 12, 1944.  R. O. POWERS  2,365,001
FLUID CONDUIT CLOSURE
Filed Nov. 13, 1943
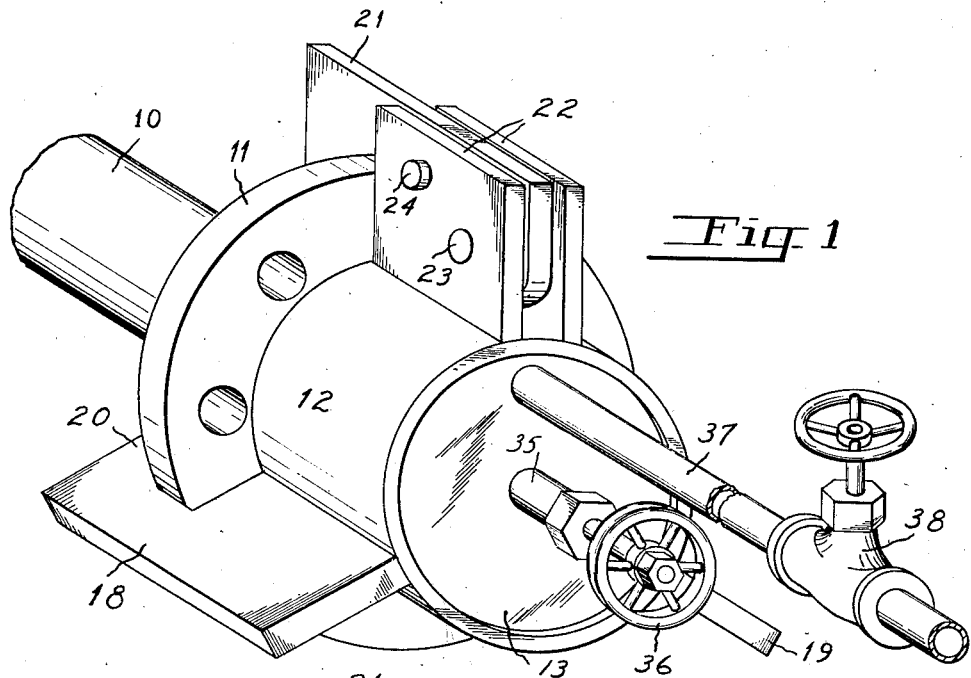
Fig. 1
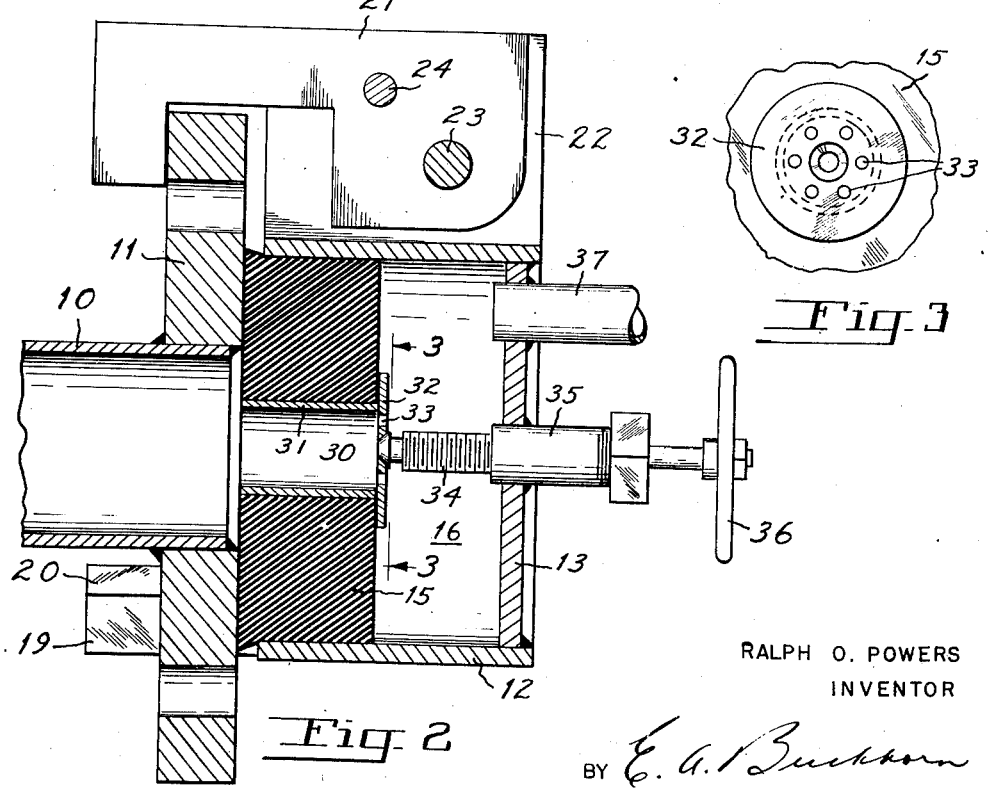
Fig. 2
Fig. 3
RALPH O. POWERS
INVENTOR
BY E. A. Buckhorn
ATTORNEY Patented Dec. 12, 1944

2,365,001

UNITED STATES PATENT OFFICE 2,365,001

FLUID CONDUIT CLOSURE

Ralph O. Powers, Portland, Oreg.

Application November 13, 1943, Serial No. 510,244

13 Claims. (Cl. 138—90)

The present invention relates to closure means for use in hydrostatic pressure testing of fluid conduits.

In testing hollow cylindrical bodies, such as lengths of pipe, for strength and tightness, the opposite ends thereof are closed and a suitable fluid is introduced into the body and a predetermined test pressure applied. Usually the ends of the fluid conduits are temporarily closed for making the tests by a cover plate and gasket which are bolted to the end flange on the conduit. Much time and effort is consumed in applying and removing such a cover plate. It is a general object of the present invention, therefore, to provide a new and improved portable closure device for use in hydrostatic pressure testing of fluid conduits and which may relatively rapidly be attached to the end of the conduit with minimum time and effort.

More specifically, it is an object of the present invention to provide a new and improved means for closing the end of a flanged cylinder and which means employs the pressure of the test fluid for effecting the fluid tight seal over the end of the conduit.

A further object is to provide a portable closure device for use in testing of hollow cylindrical bodies, the device employing the pressure of the test fluid for urging a sealing member into fluid tight engagement against the end of the conduit, the device comprising relatively few parts of a simple rugged design and of low manufacturing cost.

In accordance with the illustrated embodiment of the invention, the device comprises a cylinder having a closed end with a piston slidably arranged therein. Means secured to the outside of the cylinder are adapted to engage with the end portion of the conduit and hold the cylinder over the end thereof in a substantially aligned relation with respect thereto. A passage is provided through the piston permitting flow of fluid from the interior of the conduit to the chamber behind the piston so that fluid pressure acting upon the increased area on the reverse side of the piston urges it into tightly sealing engagement with the end of the conduit.

These and other objects and advantages will be more fully apparent from a perusal of the following description and accompanying drawing which form a part of this specification while the features of novelty will be pointed out with greater particularity in the appended claims.

In the drawing Fig. 1 is a perspective view of the closure device constructed in accordance with the present invention and shown attached to the end of a fluid conduit; Fig. 2 is a longitudinal sectional view of the closure device shown in Fig. 1; and Fig. 3 is a detail view taken along the line 3—3 of Fig. 2.

Referring to the drawing, the end of a fluid conduit is shown at 10 having a conventional bolting flange 11 welded upon the end thereof. The closure device of the present invention comprises a housing including a cylindrical portion 12 closed at the outer end, such as by the end wall 13. A piston 15, slidably arranged within the cylinder 12 and defining a chamber 16 between it and the end wall 13, is movable into engagement with the end of the fluid conduit for effecting a fluid tight seal therewith. For facilitating tightness of the seal, it is preferred that at least an annular portion of the face of the piston engageable with the end of the fluid conduit is of a suitable compressible material. The piston should also include an annular portion of compressible material for engaging with the inner wall of the cylinder 12 for effecting a fluid tight seal therewith. If desired, the entire piston may be of compressible material, such as molded rubber, as indicated in the drawing.

Suitable means are provided for removably attaching the housing onto the end of the conduit. In the case of conduit sections provided with bolting flanges, such as 11, on the ends thereof the attaching means may include a pair of radially spaced members 18 and 19 having inwardly extending hook portions 20 on the ends thereof for cooperatively hooking behind the oppositely facing shoulder of the bolting flange 11. A third hook member, such as 21, may be hingedly secured between a pair of outwardly extending lug portions 22 rigidly secured to the cylinder 12. The hook 21 may be arranged for pivotal movement about pin 23 and secured in the lowered position, that is, hooked behind the bolting flange 11, by a removable retaining pin 24. By means of the hook members 18, 19 and 21 the cylinder 12 may readily be attached in a substantially axially aligned relation over the end of the conduit with minimum time and effort. It will be obvious that the members 18 and 19 may also be secured to the cylinder 12 in much the same manner as the hook member 21 whereby upon removal of the various pins 23 the size of the hooks may readily be changed so as to adapt the closure device for mounting upon bolting flanges 11 of varying diameters.

The piston 15 is provided with a passage 30 extending axially therethrough and within which passage is arranged a metal tube 31. Secured as by welding to the end of tube 31 is a disc member 32 having a plurality of perforations 33 therethrough providing communication between the tube 31 and the cylinder chamber 16. For initially moving the piston 15 into contacting engagement with the end of the conduit, a spindle 34 is threadedly arranged in the bushing 35 secured axially of the housing in the end wall 13. A handwheel 36 is secured to the outer end of the spindle 34. The inner end of the spindle is adapted to engage centrally of the disc 32 for effecting shifting of the piston. A conduit 37 extends through the end wall 13 and is provided with a manually operable valve 38 therein.

The operation of the closure device is substantially as follows. To attach the device onto the end of a conduit the handwheel 36 is first backed off a ways and the piston, or plug, 15 is pressed slightly back into the cylinder 12. The two hooks 18 and 19 are first engaged behind the rim of the bolting flange 11 and the hinged hook 21 is then lowered and secured in position by the insertion of the retaining pin 24. The piston 15 is then shifted forwardly into initial engagement with the end surface of the conduit by means of the spindle 34 rotated through handwheel 36.

With closure devices thus attached to the opposite ends of the conduit, pressure fluid may be introduced through the pipe 37 from whence it will flow into the chamber 16, through openings 33 and passage 30 into the interior of the conduit. Air displaced from the conduit may escape through the pipe 37 of the closure device at the opposite end of the conduit. When substantially all of the air is removed from the conduit, the valve 38 at that end of the conduit is closed and a predetermined pressure is applied to the test fluid. Due to the fact that the surface area of the piston 15 facing the chamber 16 is greater than the surface area facing the interior of the conduit, there will be a resultant pressure tending to force the piston 15 against the end of the conduit 10. Obviously, the greater the test pressure, the greater will be the force tending to urge the piston into sealing engagement with the end of the conduit. It is necessary initially to move the piston 15, by operation of the handwheel, into mere engagement with the end of the conduit so as to prevent the free flow of the test fluid between the end of the conduit and the face of the piston. As soon as pressure starts to build up within the conduit a resultant of force will immediately act upon the piston to press it tightly against the end of the conduit. This resultant force will be countered by the hooks 18, 19 and 21 engaging behind the rim of the bolting flange 11.

It will be observed that the disc 32 mounted upon the inner surface of the compressible piston or plug member 15 is of a diameter substantially equal to the inner diameter of the conduit. This disc, in addition to providing a bearing plate for the end of the spindle 34, also serves to stiffen the central portion of the piston and prevent it from being unduly deformed under the differential pressure. It will be obvious that such a stiffening means for the frangible piston portion may be arranged otherwise than as shown.

Having described the invention in what is considered to be a preferred embodiment thereof, it is desired that it be understood that the specific details are merely illustrative and that the invention may be carried out in other ways.

I claim:

1. A portable fluid conduit closure comprising a housing including a cylindrical portion having an end wall, a piston in said cylindrical portion, said piston including a compressible face portion adapted to engage the end of the conduit and effect a fluid tight seal therewith, said housing including means for the attachment thereof to the end of a conduit to be tested, manually operable means extending through said end wall for engaging with said piston and shifting said piston into engagement with the end of said conduit, a passage through said piston establishing communication between the interior of said cylindrical portion and the interior of the conduit to be tested, and conduit means including a valve communicating with said cylindrical portion.

2. A portable fluid conduit closure comprising a housing including a cylindrical portion having an end wall, a piston in said cylindrical portion, said piston including an annular compressible face portion on the opposite side with respect to said end wall and adapted to engage about the end of the conduit and effect a fluid tight seal therewith, said housing including means for engaging with the exterior of the conduit adjacent the end thereof and attaching said housing thereto in a substantially aligned relation of said cylindrical portion to the conduit, means extending through said end wall for engaging with said piston and shifting said piston into initial engagement with the end of said conduit, a passage through said piston providing communication between the interior of said conduit and the interior of said cylindrical portion.

3. A portable fluid conduit closure device comprising a cylinder closed at one end, a piston slidably arranged in the other end of said cylinder, means for securing said cylinder to the end portion of a conduit with said cylinder extending in a substantially aligned relation with respect thereto, said piston being adapted to engage with the end of said conduit and effect a fluid tight seal thereagainst, means extending into the closed end of said cylinder for engaging with said piston and shifting said piston into initial engagement with the end of said conduit, and a passage extending through said piston providing communication between the interior of said conduit and the end chamber of said cylinder.

4. A portable fluid conduit closure including a housing defining a piston chamber therein, a piston in said chamber, means on said housing for engaging the conduit exterior and securing said housing to the end of said conduit, a passage through said piston providing communication between the interior of said conduit and the piston chamber on the opposite side of said piston, and means on said housing for urging said piston into initial engagement with the end of said conduit.

5. A portable fluid conduit closure device comprising a housing including a cylindrical portion having an end wall, a piston in said cylindrical portion defining a chamber between it and said end wall, said piston including an annular compressible face portion on the opposite side thereof with respect to said end wall and adapted to engage with the end of the conduit and effect a fluid tight seal therewith, arm means secured to said housing for extending over the end portion of the conduit, said arm means including means for removably attaching said housing to said conduit end portion and means for establishing communication between the interior of the conduit and said chamber.

6. A portable fluid conduit closure device comprising a cylinder closed at one end, a piston slidably arranged in the other end of said cylinder, a pair of circumferentially spaced hooks fixedly secured to said cylinder, a third hook hingedly secured to said cylinder and cooperating with said first mentioned hooks for engaging a shoulder on the end of a conduit and removably attaching said cylinder in a substantially aligned relation with respect to the conduit, and a fluid passage extending axially through said piston.

7. A portable fluid conduit closure device comprising a cylinder closed at one end, a piston slidably arranged in the other cylinder end, a plurality of radially spaced arms secured to said cylinder for engaging behind a shoulder on the end of a conduit and removably attaching said cylinder in a substantially aligned relation thereto, said piston being movable into engagement with the end of the conduit for effecting a fluid tight seal therewith, and a fluid passage extending axially through said piston.

8. A portable fluid conduit closure including a housing having a recess therein, a compressible member closing the end of said recess, means for attaching said housing onto the end of a conduit with said compressible member next adjacent the end of the conduit, means establishing communication between the interior of the conduit and said recess, and means for manually urging said member into contacting relation with the end of the conduit.

9. A portable fluid conduit closure comprising a housing having a recess therein, a compressible member closing the end of said recess, means for attaching said housing onto the end of a conduit with said member next adjacent thereto, a passage through said member providing communication between the interior of the conduit and said recess and means secured to said member for stiffening the central portion thereof over the open end of the conduit.

10. A portable fluid conduit closure including a housing defining a cylindrical piston chamber open at one end, a piston comprising a cylindrical member of compressible material arranged in said chamber adjacent the open end thereof, means on said casing for engaging the conduit exterior for removably attaching said housing adjacent the end of a conduit with said open chamber end next adjacent said conduit and a passageway extending through said piston providing communication between the interior of said conduit and said piston chamber.

11. A portable fluid conduit closure device comprising a housing including a cylindrical portion having an end wall, a piston in said cylindrical portion defining a chamber between it and said end wall, said piston being adapted to engage with the end of the conduit and effect a fluid tight seal thereagainst, said housing including means for engaging with the exterior of said conduit adjacent the end thereof and attaching said housing thereto in a substantially aligned relation of said cylindrical portion to the conduit, a passage extending through said piston providing communication between the interior of said conduit and said chamber, and conduit means including a valve communicating with said chamber.

12. A portable fluid conduit closure including a housing having a piston chamber therein, the interior of said chamber communicating with the interior of said conduit, attachment means secured to said housing for cooperatively engaging an external shoulder on said conduit, a piston in said chamber movable by pressure of fluid from said conduit into sealing engagement with the end of said conduit.

13. A portable fluid conduit closure device comprising a cylinder closed at one end, a piston slidably arranged in the other end of said cylinder, means on said cylinder for engaging the exterior of the end portion of a conduit and securing said cylinder to said conduit in a substantially aligned relation with respect thereto, said piston being adapted to engage with the end of said conduit and effect a fluid tight seal thereagainst, and a passage extending through said piston providing communication between the interior of said conduit and the end chamber of said cylinder.

RALPH O. POWERS.